US006199136B1

(12) United States Patent
Shteyn

(10) Patent No.: US 6,199,136 B1
(45) Date of Patent: Mar. 6, 2001

(54) METHOD AND APPARATUS FOR A LOW DATA-RATE NETWORK TO BE REPRESENTED ON AND CONTROLLABLE BY HIGH DATA-RATE HOME AUDIO/VIDEO INTEROPERABILITY (HAVI) NETWORK

(75) Inventor: Yevgeniy Eugene Shteyn, Cupertino, CA (US)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/146,020

(22) Filed: Sep. 2, 1998

(51) Int. Cl.[7] ............................ H04L 12/28; H04L 12/16; H04L 29/06; G06F 13/00; G06F 15/16

(52) U.S. Cl. ............................ 710/129; 710/8; 710/10; 710/12; 710/72; 710/104; 710/105; 709/220; 709/230; 709/209; 709/238; 709/321; 709/331; 709/328; 709/301; 709/305; 370/260; 370/261; 370/263; 370/266; 370/278; 370/282; 370/402; 370/420

(58) Field of Search ........................ 710/10, 8, 100, 710/104, 72, 12, 9, 105, 129; 709/229, 220, 230, 209, 238, 321, 331, 328, 301, 305; 370/395, 260, 266, 420, 261, 263, 402, 278, 282; 359/118; 364/132, 140.03; 340/825.22, 825, 54

(56) References Cited

U.S. PATENT DOCUMENTS

| 5,740,075 | * | 4/1998 | Bigham et al. ................... 709/229 |
| 5,831,848 | * | 11/1998 | Rielly et al. ..................... 364/132 |
| 5,909,183 | * | 6/1999 | Borgstahl et al. ............. 340/825.22 |
| 5,956,165 | * | 9/1999 | Fee et al. ........................ 359/118 |
| 6,032,202 | * | 2/2000 | Lea et al. ............................ 710/8 |
| 6,038,625 | * | 3/2000 | Ogino et al. ..................... 710/104 |
| 6,041,056 | * | 3/2000 | Bigham et al. ................... 370/395 |
| 6,052,750 | * | 4/2000 | Lea ................................... 710/72 |
| 6,085,236 | * | 7/2000 | Lea ................................. 709/220 |
| 6,091,714 | * | 7/2000 | Sensel et al. .................... 370/260 |

FOREIGN PATENT DOCUMENTS

| 9719393A | * | 5/1997 | (WO) | ............................ G50B/15/02 |
| 200014927A | * | 3/2000 | (WO) | ............................ H04L/12/28 |

OTHER PUBLICATIONS

Local Area Network Protocol for Autonomous Control of Attached Devices, IBM Tech. Dis. Bull., Jul. 1990, vol. 33, No. 2, pp. 288–294.*

"The HAVi Architecture: Specification of the Home Audio/Video Interoperability (HAVi) Architure", Version 0.86, Draft May 17, 1998.

* cited by examiner

Primary Examiner—Thomas C. Lee
Assistant Examiner—Katharina Schuster
(74) Attorney, Agent, or Firm—Peter Verdonk

(57) ABSTRACT

A PC-based home automation system uses a low data-rate transport layer and COM-based software components for control of devices in a home automation network. The home automation system is merged with a messaging-based HAVi-network that uses IEEE 1394 as a high data-rate transport layer. The HAVi-network controls audio/video equipment in a home entertainment system. The home automation services and devices are registered as a HAVi-compliant elements with the HAVi network's FAV or IAV device. The home automation resources (devices and services) have both COM OLE Automation Interfaces and HAVI-compliant interfaces to permit control of the home automation system from the HAVi-network.

16 Claims, 2 Drawing Sheets

METHOD AND APPARATUS FOR A LOW DATA-RATE NETWORK TO BE REPRESENTED ON AND CONTROLLABLE BY HIGH DATA-RATE HOME AUDIO/VIDEO INTEROPERABILITY (HAVI) NETWORK

FIELD OF THE INVENTION

The invention relates to a home automation system and to a home entertainment system.

BACKGROUND ART

A consortium of consumer electronics manufacturers, among which Royal Philips Electronics, has been working on specifications for a core of API's (application programming interfaces) for digital consumer electronics appliances in a home network so as to provide a standard for the audio/video electronics and the multimedia industries. An API specifies the method required for making requests to an operating system or application program. The home network is considered a distributed computing platform. The primary goal of the standard, referred to as the HAVi (Home Audio/Video interoperability) architecture is to ensure that products of different vendors can interoperate, i.e., cooperate to perform application tasks. Current CE devices, such as home entertainment equipment (DVD players, DV camcorders, digital TV sets, etc.) are digital processing and digital storage systems. Connecting these devices in networks makes it possible to share processing and storage resources. This allows coordinating the control of several CE devices simultaneously, e.g., in order to simplify user-interaction. For example, a first device may instantiate recording on a second device while accessing an EPG (electronic program guide) on a third device. The home network provides the fabric for connecting the CE devices. It allows connected devices to exchange both control (one device sending a command to another) and AV (audio/video) data (one device sending an audio or video stream to another device). The network has to meet several requirements in order to achieve all this. It must support timely transfer of high-data-rate AV streams. The network must support self-configuration, self-management, and hot plug-and-play. It must require low-cost cabling and interfaces.

The HAVi software architecture is platform-independent and based on Java. HAVi uses the IEEE 1394 high-performance serial bus protocol for transport of control and content among the devices connected to the network. The IEEE 1394 standard is a dynamically configurable, low-cost digital network. IEEE 1394 defines both a backplane physical layer and a point-to-point cable-connected virtual bus implementations. The backplane version operates at 12.5, 25 or 50 Mbits/sec. The cable version supports data rates of 100, 200 and 400 Mbits/sec. The standard specifies the media, topology, and the protocol. The IEEE 1394 transport protocol is particularly useful for supporting audio and video communication protocols, due to its high data-rate capability.

The HAVi architecture controls the CE devices in the network through abstract representations of the CE devices. The abstract representations are operated upon by a controller and hide the idiosyncrasies of the associated real CE devices. The abstract representation thus provides a uniform interface for higher levels of software. The abstract representations are registered with their control properties reflecting those of the device represented. The abstract representations expose their Interoperability API's to the applications and collectively form a set of services for building portable, distributed applications on the home network.

The architecture allows a device to send a command or control information to another device in the home network. A HAVi-compliant device contains data (above abstract representation, referred to as Device Control Model or DCM, see further below) relating to its user-interface (e.g., GUI) and to its control capabilities. This data includes, for example, HAVi bytecode (Java) that can be uploaded and executed by other devices on the network. A HAVi-compliant device has, as a minimum, enough functionality to communicate with other devices in the system. During interaction, devices may exchange control and data in a peer-to-peer fashion. This ensures that at the communication level, none of the devices is required to act as the master or controller of the system. On the other hand, it allows a logical master or controller to impose a control structure on the basic peer-to-peer communication model. HAVi distinguishes between controllers and controlled devices as explained further below. A controller is a device that acts as a host for a controlled device. A controller hosts the abstract representation for the controlled device. The control interface is exposed via the API of the abstract representation. This API is the access point for applications to control the device.

HAVi-compliant CE devices are devices categorized as follows: Full-AV devices (FAV's), Intermediate-AV devices (IAV's) and Base-AV devices (BAV's).

An FAV contains a complete set of the software components of the HAVi-software architecture (see below). An FAV is characterized in that it has a runtime environment for HAVi bytecode. This enables an FAV to upload bytecode from other devices for, e.g., providing enhanced capabilities for their control. An FAV may be formed by, e.g., a HAVi-compliant Set Top box, a HAVi-compliant Digital TV receiver, and an home PC. For example, an intelligent TV receiver can be the HAVi controller of other devices connected on the network. The receiver gets the bytecode uploaded from another device for creating a UI for this device and for providing external control of this device. An icon presenting this device can be made to appear on the TV screen and user interaction with the icon may cause elements of the control program to actuate the represented device in a pre-specified manner.

An IAV does not provide a runtime environment for HAVi bytecode, but may provide native support for control of specific devices on the home network. An IAV comprises embedded software elements that provide an interface for controlling general functions of the specific devices. These software elements need not be HAVi bytecode and may be implemented as native applications on the IAV that use native interfaces to access other devices.

A BAV may provide uploadable HAVi bytecode but does not host any of the software elements of the HAVi architecture. A BAV is controllable through an FAV by means of the former's uploaded bytecode. A BAV is controllable through an IAV via the native code. Communication between an FAV or IAV, on the one hand, and a BAV on the other hand requires that the HAVi bytecode be translated to and from the command protocol used by the BAV.

The main software elements included in the core specification of the HAVi architecture are the ones listed below. For a more detailed explanation of these elements, please see the HAVi spec., herein incorporated by reference.

1) A 1394 Communications Media Manager (CMM)—acts as an interface between the other software elements and the IEEE 1394.
2) An Event Manager (EM)—informs the various software elements of events in the network such as the changes in the network configuration that occur when appliances (devices) are added or removed from the network.

3) A Registry—maintains information about the appliances connected to the network and the functions they offer. Applications can obtain this information from the registry.

4) A Messaging System (MS)—serves as an API that facilitates communication between the software elements of the various appliances on the network. The messaging system provides the HAVi software elements with communication facilities. It is independent of the network and the transport layers. A messaging system is embedded in any FAV and IAV. The messaging system is in charge of allocating identifiers for the abstract representations at the FAV or IAV. These identifiers are first used by the abstract representations to register at the FAV or IAV. Then they are used by the abstract representations to identify each other within the home network. When a first abstract representation wants to send a message to another abstract representation it has to use the identifier of the latter while invoking the messaging API.

5) A Device Control Module (DCM)—represents an appliance on the network. Application programs can interact directly with a DCM. This shields them from the idiosyncrasies of each individual appliance.

6) A DCM Manager—Installs the DCMs. It automatically reacts to changes in the network by installing new DCMs for new appliances.

7) A Data Driven Interaction (DDI) Controller—renders a GUI (Graphical User Interface) on a appliance's display on behalf of a HAVi software element. It supports a wide range of displays, varying from graphical to text-only.

8) A Stream Manager (SMGR)—creates connections and routes real-time AV streams between two or more appliances on the network.

The HAVi architecture specifies at least two levels of interoperability, referred to as level 1 and level 2.

Level 1 interoperability addresses the general need to allow existing devices to communicate at a basic level of functionality. To achieve this, level 1 interoperability defines and uses a generic set of control messages (commands) that enable one device to communicate with another device, and a set of event messages that it should reasonably expect from a device given its class (TV, VCR, DVD player, etc). To support this approach a basic set of mechanisms is required: device discovery; communication; and a HAVi message set.

As to device discovery: each device in the home network needs a well-defined method that allows it to advertise its capabilities to others. The HAVi approach is to utilize so-called SDD data: self describing data. The SDD data is required on all devices in the network. SDD data contains information about the device which can be accessed by other devices. The SDD data contains, as a minimum, enough information to allow instantiation of a so-called embedded device control module (embedded DCM). An embedded DCM is a piece of code pre-installed on a controlling IAV or FAV in platform-dependent code and using native interfaces to access the IAV's or FAV's resources. As mentioned above, a DCM for a device is a software element that provides an interface for control of general functions of the device. Instantiation of an embedded DCM results in registration of the device's capabilities with a registry. The registry provides a directory service and enables any object on the network to locate another object on the network. Registering allows applications to infer the basic set of command messages that can be sent to a specific device on the network.

As to communication: once an application has determined the capabilities of a device, the application needs to be able to access those capabilities. This requires a general communication facility allowing applications to issue requests to devices. This service is provided by the HAVi messaging systems and DCMs. The application sends HAVi messages to DCMs, the DCMs then engage in proprietary communication with the devices.

As to HAVi message sets: in order to support level 1 interoperability a well-defined set of messages is required that must be supported by all devices of a particular known class (e.g., the class of TV receivers, the class of VCR's, the class of DVD players, etc.). This ensures that a device can work with existing devices, as well as with future devices, irrespective of the manufacturer.

These three basic requirements support a certain minimal level of interoperability. Since any device can query the capabilities of another via the registry, any device can determine the message set supported by another device. Since applications have access to the messaging system, any device can interact with any other device.

Level 1 interoperability ensures that devices can interoperate at a basic level of functionality. However, a more extended mechanism is needed to also allow a device to communicate to other devices with any additional functionality that is not present in the embedded DCM's on an FAV. For example, embedded DCM's may not support all features of existing products and are unlikely to support those totally new ones of future product categories. Level 2 interoperability provides this mechanism. To achieve this, the HAVi Architecture allows uploadable DCM's as an alternative to the embedded DCM's mentioned above. The uploaded DCM may replace an existing DCM on an FAV. An uploadable DCM may be provided by any suitable source, but a likely technique is to place the uploadable DCM in the HAVi SDD data of the BAV device, and upload from the BAV to the FAV device when the BAV is connected to the home network. Because the HAVi Architecture is vendor-neutral, it is necessary that the uploaded DCM will work on a variety of FAV devices all with potentially different hardware architectures. To achieve this, uploaded DCMs are implemented in HAVi (Java) bytecode. The HAVi bytecode runtime environment on FAV devices supports the instantiation and execution of uploaded DCMs. Once created and running within a FAV device, the DCM communicates with the BAV devices in the same manner as described above.

The efficiency of level 2 interoperability becomes clear when one considers resources needed to access a specific device functionality. Level 2 allows a device to be controlled via an uploaded DCM that presents all the capabilities offered by the device, whereas to achieve similar functionality in level 1, this DCM would have to be embedded somewhere in the network. For example, when a new device is added to a network, level 1 requires that at least one other device comprises an embedded DCM compatible with the new device. In comparison, level 2 only requires that one device provide a runtime environment for the uploaded DCM obtained from the new device.

The concept of uploading and executing bytecode also provides the possibility for device-specific applications called Device Control Applications. Through these applications a device manufacturer can provide the user a way to control special features of a device without the need for standardizing all the features in HAVi. The application is provided by a DCM in HAVi bytecode and can be uploaded and installed by each FAV device on the network.

For further information, reference is made to the HAVi specification and the IEEE 1394 specification that are available in the public domain. The HAVi core specification has been made available on the web at, for example, http://www.sv.philips.com/news/press, and is incorporated herein by reference.

OBJECT OF THE INVENTION

Currently, the HAVi spec does not consider the role of a PC in a HAVi network. A PC may complement the HAVi-network in several ways. HAVi is currently concerned with audio/video only, and does not specifically address, e.g., control of a home security system, an air-conditioning unit, a lighting system. It is known to create a home automation system using dedicated software applications on a PC and a communication protocol, e.g., CEBus or X-10, for transmission of commands via the power lines as the transport layer. These home automation functionalities do clearly not require a relatively expensive high-performance, high bit-rate transport protocol such as the 1394 Serial Bus. It would be some sort of overkill to integrate the modest home automation devices into a HAVi system and have them interconnected through the 1394 Serial Bus at the transport layer.

It is an object of the invention to merge a low-bite rate home network with a high bit-rate home network. It is a further object to enable a HAVi-system and a low bit rate PC-based home automation system to co-exist and enhance each other's functionalities.

SUMMARY OF THE INVENTION

To this end, the invention provides a method for enabling a high data-rate first control network to control a device in a low data-rate second network. The high data-rate relates to, for example, IEEE 1394 whereas the low data rate relates to, for example power line enables CEBus or X-10. The first network comprises a HAVi network. The second network has a controller, e.g., a PC, for control of the device through an application interacting with a software object representative of the device. The method comprises enabling the controller to be connected to the HAVi network using a HAVi-compliant transport layer. The method also comprises providing HAVi-compliant SDD representative of a functionality in the low data-rate network, and enabling registering the HAVi SDD on the HAVi network. Preferably, the controller comprises a software service exposing a native interface to the application, and the method further comprises enabling the software service to expose a HAVi-compliant interface to the first network, and enabling registering the second network as an FAV device on the HAVi network.

From the perspective of the system assembler, the control of the second network by the first network can be enabled by connecting the networks and loading the proper software components, e.g., through a diskette or through downloading via the Internet. From the perspective of the user, the control is enabled by allowing the first network to communicate with the second network.

The PC controls the second network based on, for example, COM (Component Object Model), a technology of Microsoft. COM is an example of component-based software models for creating applications using modular software components. These technologies have become widely available and accepted in the software development industry. Other examples are DCOM, ActiveX, Java, JavaBeans. COM is a generic mechanism allowing applications to communicate in a consistent way and is a framework for developing and supporting program component objects. It provides capabilities similar to those defined in CORBA (Common Object Request Broker Architecture), the framework for the interoperation of distributed objects in a network. OLE (object linking and embedding) Automation provides services for the compound document that users see on their display, COM provides the underlying services of interface negotiation and event services (putting one object into service as the result of an event that has happened to another object). In this implementation home devices are modeled on the PC as OLE Automation objects (abstract representations) that use properties to expose device controls and events to signal state changes. OLE Automation is a COM technology that enables scripting and late binding of clients to servers. OLE Automation provides communication with other programs through calls to features (commands and queries) that the programs have made available for external use. Before using an object, a client application has first to obtain the object's interface pointer. The interface pointer is obtained through the network's directory by binding the object's name or by enumerating devices. Standard COM API's for moniker binding can be used. References to objects can be obtained by calling GetObject or CoGetObject with a string specifying the desired device's name or ID. The application can then manipulate the object by setting or retrieving its properties. When an application sets or modifies a property of an object corresponding with a home device the property-setting operation or modification operation is converted into a command that is sent across the network to the relevant device. The objects may differ in implementation and protocol support, but expose a similar property-based model to client applications running on a PC with a Windows operating system.

In a typical embodiment of the invention, a PC-based home automation system uses a low data-rate transport layer and COM-based software components for control of devices in a home automation network. The home automation system is merged with a messaging-based HAVi-network that uses IEEE 1394 as a high data-rate transport layer. The HAVi-network controls audio/video equipment in a home entertainment system. The home automation services and devices are registered as a HAVi-compliant elements with the HAVi network's FAV or IAV device. The home automation resources (devices and services) have both COM OLE Automation Interfaces and HAVI-compliant interfaces to permit control of the home automation system from the HAVi-network.

For the sake of completeness, reference is made to, filed Aug. 13, 1998 of Lawrence Freeman for "Home Network Autoconfiguration", U.S. Ser. No. 09/133,622 of same Assignee and herein incorporated by reference. This document relates to automatically configuring PC's in a network in order to share resources registered with the individual PC's. Services and resources local to one PC are registered with the other PC and vice versa. The registry hides whether a service or resource is remote or local. In operational use of the network, a resource or service local to one PC is addressable from the remote PC as if it were local to the latter. A home network of PC's can be configured automatically in this manner.

BRIEF DESCRIPTION OF THE DRAWINGS

The invention is explained by way of example and with reference to the accompanying drawings, wherein.

PREFERRED EMBODIMENT

Figure 1:
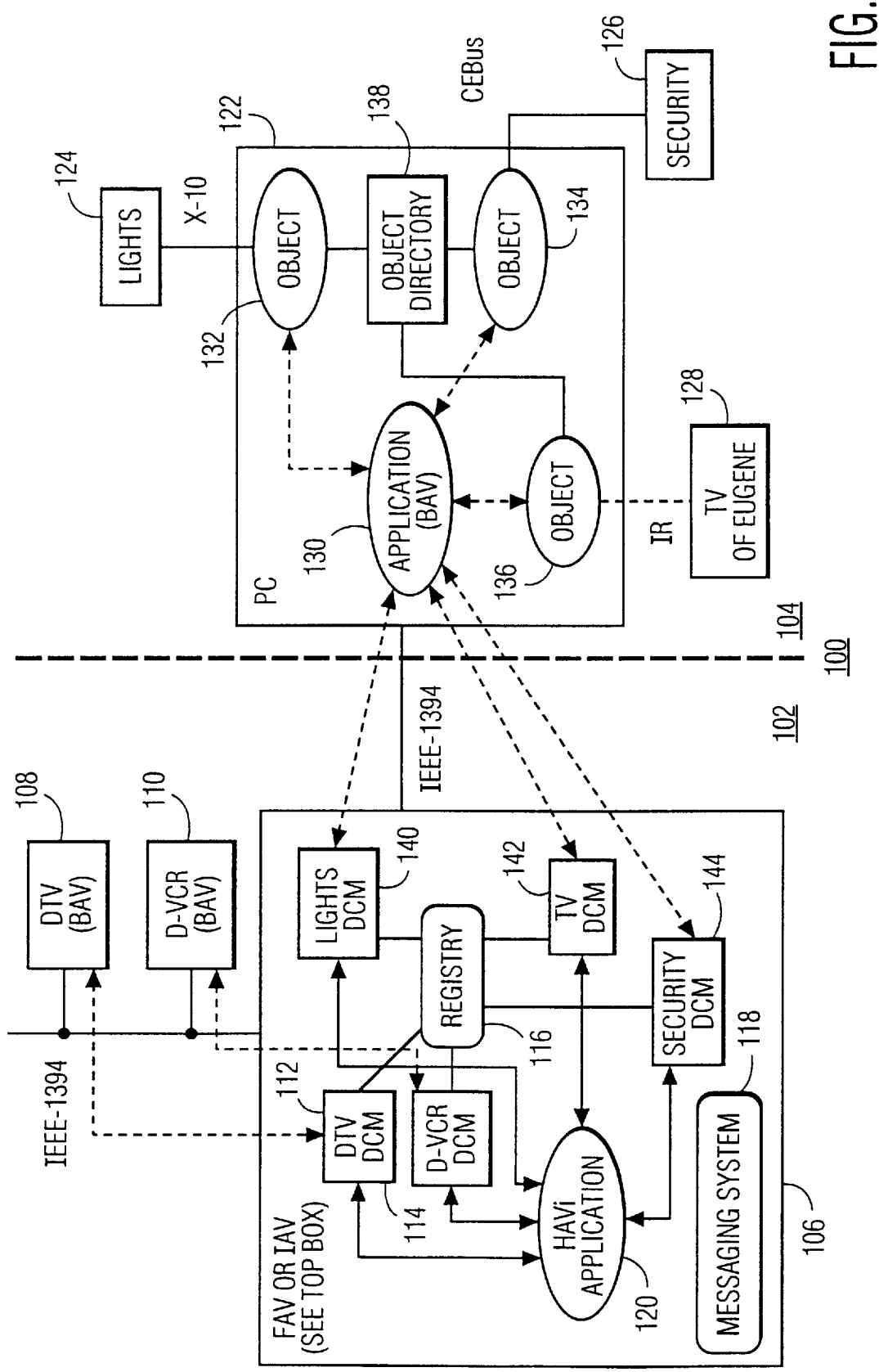
FIG. 1 is a block diagram of a system in the invention.

FIG. 1 is a block diagram of a system 100 in the invention. System 100 comprises a first network 102 and a second network 104. Network 102 comprises a sub-system based on messaging among software representations of the devices making up the sub-system. An example hereof is HAVi. discussed above. Network 104 comprises a sub-system based on modeling its devices as abstract objects. An object has properties that expose control functionalities of the associated device to a software application. A state change of an object as a consequence of an event from outside is passed on to the software application. The application manipulates the objects by changing or setting their properties. When the application modifies a property of an object associated with a certain physical device a command is sent to the associated device. An example of such a system is one based on COM of Microsoft or on CORBA.

Network 102 in this example comprises a HAVi-based sub-system that has an FAV 106, and first and second BAV's 108 and 110 connected to FAV via a 1394 bus at the transport layer. A BAV connected to FAV 106 may use a proprietary communication protocol between itself and FAV 106. BAV 108 has an abstract representation 112 that has been uploaded to FAV 106. BAV 110 has an abstract representation 114 that has been uploaded to FAV 106. FAV 106 further comprises a Registry 116, a Messaging System 118 and a software application 120. Registry 116 provides an inventory of the devices, e.g., BAV 108 and 110, that have registered with FAV 106 and have thereby been functionally connected to network 102. Registry 116 provides an API to register software elements. Registry 116 maintains for each element registered its identifier and its attributes as specified by the corresponding SDD. Registry 116 also provides a query interface that can be used by software elements to search for a target software element. Messaging System 118 serves as an API that facilitates communication between the software elements of the various devices, e.g., BAV's 108 and 110, on the network. Messaging System 118 provides the HAVi software elements with communication facilities. Messaging System 118 is in charge of allocating identifiers for abstract representations 112 and 114 at FAV 106. These identifiers are used by abstract representations 112 and 114 to identify each other within network 102. When abstract representation 112 wants to send a message to abstract representation 114 it has to use the identifier of the latter while invoking the messaging API. Application 120 issues requests to, and receives calls from, devices 108 and 110 through their abstract representations. For example, application 120 sends a message to abstract representation 112, whereupon abstract device 112 engages in communication with device 108. A typical feature of sub-system 102 is the capability of FAV 106 to accept uploaded bytecode as abstract representations that get registered with FAV 106 and are interacted with in the runtime provided for control of AV devices 108–110. The HAVi architecture is dedicated to control of audio/video devices, e.g., a DTV and DVCR, that typically require a high data-rate.

Network 104 comprises a PC 122 connected to devices 124, 126 and 128 that use, for example, X-10, CEBus, USB (not shown) service providers for communication with PC 122 via the power lines, and consumer IR and RF (not shown) service providers, all of which are relatively low data-rate protocols. Note that 1394 is a relatively high-data rate protocol. PC 122 has a Windows-based operating system such as Win95, Win98, WinCE, or Windows NT. The host software on PC 122 relies on existing COM technology to provide means for application 130 to access devices and services in sub-system 104. Devices 124–128 are associated with abstract objects 132, 134 and 136 at PC 122. Objects 132–136 have properties that expose control functionalities of the associated devices. Abstract objects 132–136 supply events to an application 130 to indicate state changes of the objects brought about by the associated ones of devices 124–128. Application 130 manipulates objects 132–136 by changing or setting their properties, e.g., as a result of receiving an event. When application 130 modifies a property of, e.g., object 132, the modifying operation is converted into a command that is sent to device 124 associated therewith. In this example, PC 122 has the necessary accessories and drivers for X-10, CEBus and consumer IR service provides to control a compatible lighting system, home security system and a TV. Before using an object, application 130 has first to obtain the object's interface pointer. The interface pointer is obtained through a directory 138 by binding the object's name or by enumerating devices.

PC 122 is connected to FAV 106 at the transport layer via the 1394 serial bus. Devices 124, 126 and 128 are represented at FAV 106 by abstract representations 140, 142 and 144 as if they were BAV's. From the perspective of application 130, controller 106 is an IAV or an FAV. Abstract representations 140–144 are embedded DCM's or DCM's uploaded via application 130 or other means, e.g., via the Internet, and are provided with COM interfaces for communicating with application 130 on PC 122 in order to control objects 132–136 via application 130. Objects 132–136 control devices 124–128 using 25 proprietary means and interfaces. A BAV application, e.g., "activate security system 128" or "turn on lights 124", can access the PC-controlled services 132–136 as any other third party application 130. The BAV application can query a directory 138 of PC 120, determine what device are available, describe them in SDD manner to HAVi network 102, translate and pass on messages from network 102 to 104, notify network 102 of events and state changes in network 104, etc. Accordingly, this implementation 30 serves as a cost-efficient control bridge from HAVi network 102 to network 104. For example, the synergetic aspects of the combination of network 102 and 104 become apparent in a home entertainment system, where HAVi controls the audio/video presentation and is synchronized with network 104 that automatically controls the setting of ambient lighting, air-conditioning, curtains, etc. PC 122 can be given the capability to upload HAVi-bytecode to FAV 106.

Figure 2:
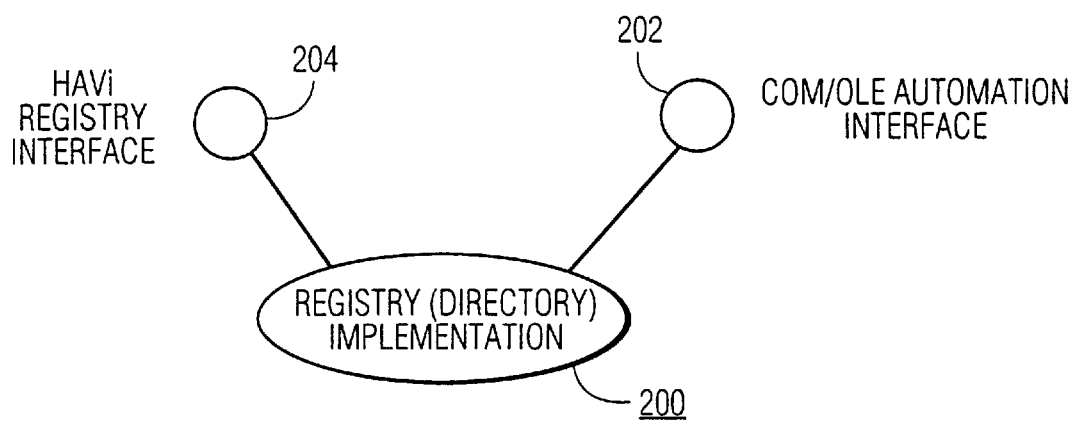
FIG. 2 is a block diagram of a software element having both a HAVi API and a COM OLE Automation Interface.

A further interesting feature of this configuration is that PC 122 has the ability to be upgraded from BAV to IAV or FAV. This is a matter of installing the appropriate software in PC 122. This enables exposing HAVi control services to devices in both network 102 and 104. Preferably, upon a HAVi upgrade of PC 122, network 104 de-registers with controller 106 and registers again as a new IAV or FAV after the necessary components have been installed at PC 122. In case PC 122 presents itself as an IAV or FAV certain architectural requirements need to be met. For example, an IAV has to have as a minimum HAVi SDD data, a 1394 Communications Manager, a Messaging System, an Event Manager, a Registry, and a DCM Manager (see above under "Background Art"). At PC 122, these software components can be built using COM. These COM-built HAVi network components are exposed as COM interfaces to non-HAVi applications, and have HAVi-defined API's as prescribed by the HAVi spec to enable HAVi applications to access these components. This is illustrated in FIG. 2 that is a diagram of an implementation 200 of a registry using COM. Registry 200 exposes a COM OLE Automation Interface 202 to application 130 and a HAVi API 204 to application 120. In this manner, element 200 is a HAVi-compliant registry such as registry 116 at FAV 106, and also serves the purpose of playing the role of directory 138. Accordingly, COM or a similar technology can be used to build HAVi-compliant software elements at PC 122 by giving them HAVi API's for access from network 102 and COM OLE Automation Interfaces for access by PC 122 as a Windows-based (e.g., Windows 95, Windows 98, WinCE or Windows NT) controller. This may not only apply to directory 138, but may also apply to elements 140, 142 and 144 that is the drawing have been presented as residing at FAV 106. The location of the DCM's code is not relevant as long as application 120 has access to it via the HAVi architecture.

I claim:

1. A method for enabling a high data-rate first control network to control a device in a low data-rate second network, wherein the first network comprises a Home Audio/Video interoperability (HAVi) network, and wherein the second network has a controller for control of the device through an application interacting with a software object representative of the device, the method comprising:
    connecting the controller to the HAVi network using a HAVi-compliant transport layer;
    providing a HAVi-compliant Self Describing Device (SDD) representative of a controllable functionality of the device in the low data-rate network; and
    enabling registering the HAVi SDD on the HAVi network.

2. The method of claim 1, comprising enabling registering the second network as a Base Audio/Video (BAV) device.

3. The method of claim 1, wherein the controller comprises a directory for exposing the software object to the application, the method comprising:
    enabling the directory to expose a HAVi-compliant interface to the first network for enabling the HAVi-network to query the directory; and
    enabling registering the second network as an Intermediate Audio/Video (IAV) device on the HAVi network.

4. The method of claim 3, wherein the directory exposes a Component Object Model (COM) Object Linking and Embedding (OLE) Automation Interface to the application.

5. The method of claim 1, wherein the controller comprises a software service exposing a native interface to the application, the method comprising:
    enabling the software service to expose a HAVi-compliant interface to the first network; and
    enabling registering the second network as a Full Audio/Video (FAV) device on the HAVi network.

6. The method of claim 5, wherein the native interface comprises an Object Linking and Embedding (OLE) Automation Interface.

7. The method of claim 1, wherein the controller comprises a Personal Computer (PC).

8. The method of claim 3, wherein the controller comprises a Personal Computer (PC).

9. The method of claim 4, wherein the controller comprises a Personal Computer (PC).

10. The method of claim 5, wherein the controller comprises a Personal Computer (PC).

11. The method of claim 6, wherein the controller comprises a Personal Computer (PC).

12. The method of claim 1, wherein the controller comprises a Personal Computer (PC) with a Windows-based operating system.

13. The method of claim 12, wherein the software object has an Object Linking and Embedding (OLE) Automation Interface to the application.

14. A method of enabling a first network to interact with a second network, wherein:
    the first network comprises:
        a high data-rate transport layer;
        a first device having a first abstract representation for a first controllable functionality of the first device;
        a second device having a second abstract representation for a second controllable functionality of the second device;
        a first controller for control of the first and second devices through interaction with the first and second abstract representations that are registered with the controller with first and second identifiers, respectively; and
        a messaging system for allocating the first and second identifiers for enabling the first device to send a message to the second device by invoking a messaging system Application Programming Interface (API) while using the second identifier;
    the second network comprises:
        a low data-rate transport layer;
        a second controller with an operating system; and
        a sub-system controllable through a software application on the second controller;
    the method comprising:
        enabling registering a resource of the second controller as a third device with the first controller using a third abstract representation for a third controllable functionality of the third device for enabling the first device to control the subsystem via the messaging system.

15. The method of claim 14, wherein the first network comprises a Home Audio/Video interoperability (HAVi) network and wherein the second controller has a Windows-based operating system with a COM-based software service and a Component Object Model (COM) based Application Programming Interface (API) for enabling an application to control the sub-system.

16. A controller device for control of a home automation network using a low data-rate transport protocol, the controller device comprising:
    a port for an IEEE 1394 high data-rate transport protocol;
    a Windows-based operating system; and
    a software component that comprises both an Object Linking and Embedding (OLE) Automation Interface and a Home Audio/Video interoperability (HAVi) compliant interface,
        wherein the controller device receives control signals via the HAVi-compliant interface and controls the home automation network via the OLE Automation Interface, in response to the control signals.

* * * * *